Nov. 12, 1968   R. J. BUCKNER   3,410,634
ILLUMINATED VIEWER WITH INTERCHANGEABLE MOUNTED SPECIMEN UNITS
Filed Oct. 4, 1965
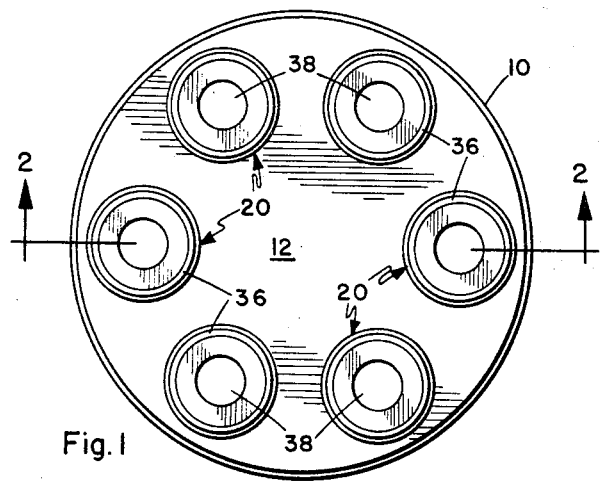
Fig. I
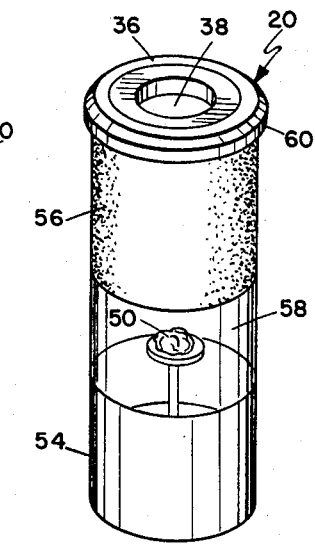
Fig. 3
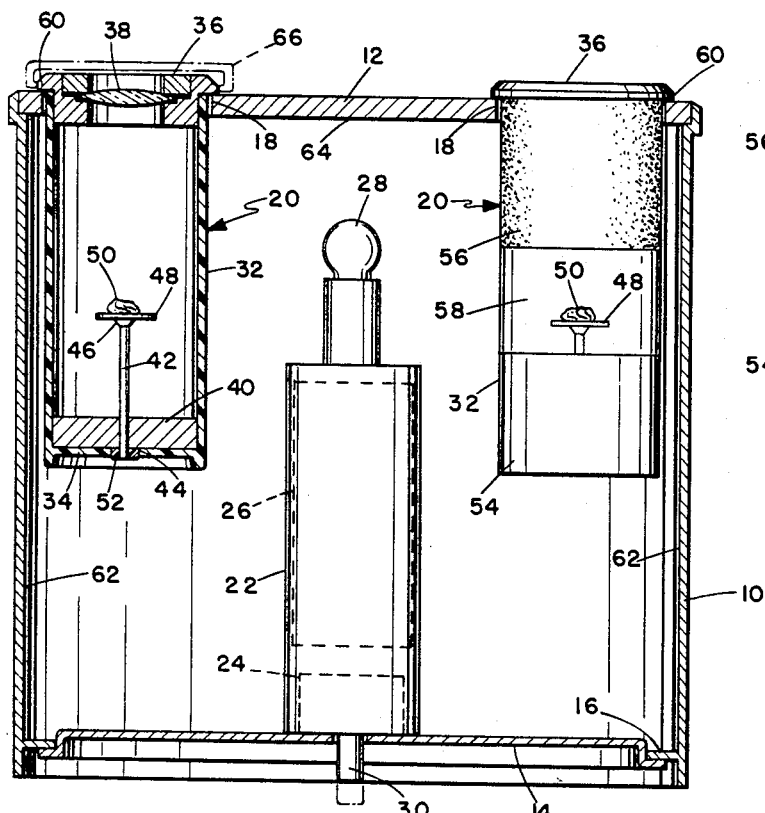
Fig. 2
*INVENTOR.*
ROBERT J. BUCKNER
BY *Knox & Knox*

United States Patent Office 3,410,634
Patented Nov. 12, 1968

3,410,634
ILLUMINATED VIEWER WITH INTERCHANGE-
ABLE MOUNTED SPECIMEN UNITS
Robert J. Buckner, 1496 Skyline Drive,
Lemon Grove, Calif. 92045
Filed Oct. 4, 1965, Ser. No. 492,829
4 Claims. (Cl. 350—239)

ABSTRACT OF THE DISCLOSURE

An illuminated viewer for small specimens with the specimen holder units arranged within a casing and supported by their upper ends in the top end panel of the casing. Each specimen holder unit is a barrel with a magnifying eyepiece and transparent central portion which latter shields the otherwise unshielded light source. The specimen holder units are individually removable from the casing and usable separately.

---

The present invention relates to optical viewers and specifically to an illuminated viewer with interchangeable specimen units.

The primary object of this invention is to provide a viewer designed to hold several specimens to be viewed, with each specimen mounted in an individual transparent walled unit, the viewer having an internal light source positioned to illuminate the specimens evenly on the viewing side.

Another object of this invention is to provide a viewer wherein any specimen unit is readily removable and replaceable while the viewer is in use.

Another object of this invention is to provide a viewer in which specimens can be inserted in any desired order for viewing in sequence, if desired, the viewer being suitable for hand holding and thus easily oriented for viewing each specimen in any position.

A further object of this invention is to provide a specimen unit wherein a specimen is securely mounted at the precise focus of a magnifying eyepiece, the unit being usable by itself or in the viewer and the specimen also being visible through the side of the unit in its natural size.

The viewer and typical specimen units are illustrated in the drawing, in which:

FIGURE 1 is a top plan view of the viewer with several specimen units in place;

FIGURE 2 is an enlarged sectional view taken on line 2—2 of FIGURE 1; and

FIGURE 3 is a perspective view of an individual specimen unit.

Similar characters of reference indicate similar or identical elements and portions throughout the specification and throughout the views of the drawing.

The viewer, as illustrated, comprises a cylindrical casing 10 having a top plate 12 and a bottom plate 14, the latter being press fitted in an annular flange 16 in the casing to facilitate removal for access and servicing. Top plate 12 has a plurality of apertures 18 to receive the specimen units 20, an arrangement of six symmetrical about the casing axis being shown as an example. Other casing configurations may be used with various arrangements and numbers of specimen units.

Mounted on the bottom plate 14 and axially disposed within casing 10 is a light source 22, containing a switch 24, battery 26 and bulb 28. Switch 24 may be of any suitable type, either manually operated or provided with a plunger 30, as illustrated, to switch on automatically when the viewer is picked up, the mechanism and circuitry being well known. Alternatively the switch can be at any other convenient location on the viewer.

The specimen unit 20 comprises a cylindrical barrel 32 of transparent plastic or glass, with a closed lower end 34. Fitted in the upper end of the barrel is an eyepiece 36 containing a lens 38 of suitable power and focal length. A simple single lens eyepiece is illustrated, but other conventional types with compound or special purpose lenses may be used. At the lower end of barrel 32 is a mounting block 40 fixed securely in place, with a stem 42 passing through the block substantially on the axis of the barrel. Stem 42 is a tight sliding fit in block 40 and extends through an enlarged opening in lower end 34, which forms a socket 44. On the upper end of stem 42 is a head 46 to which is secured a platform 48 for carrying the specimen 50. Platform 48 may be of any material which provides a suitable background for the specimen.

A convenient method of assembling the specimen unit includes inserting the block 40 into the barrel 32, with the stem 42 in the block and the specimen 50 mounted. When the block is secured in the lower end of the barrel the stem will project through socket 44. The eyepiece 36 is then secured in place and the stem 42 is pushed in or pulled out until the specimen 50 is precisely focussed in the lens 38. The excess length of stem is then cut off and the socket 44 filled with resin, cement, or other bonding material, as indicated at 52, to seal and hold the specimen mounting in place.

The lower end of barrel 32 has an opaque coating 54, preferably matt black to avoid distracting reflections and background, the coating being painted on or even incorporated into the material of the barrel. The upper end of the barrel has a translucent portion 56, made by a suitable coating or surface treatment, leaving an annular transparent zone 58 at the level of the specimen 50. In certain arrangements of specimen units and light sources the translucent portion may not be necessary, but is preferable in the configuration as shown.

Each specimen unit 20 is inserted in an aperture 18, the eyepiece 36 having a flange 60 which rests on top plate 12 and supports the unit. The height of the light source 22 is such that the bulb 28 is disposed generally level with or slightly above the transparent zone 58, so that the specimen is illuminated from above. Inner surfaces 62 of the casing 10 and the lower surface 64 of top plate 12 are made reflective to distribute the light all over the specimens. The reflective surfaces may be suitable coverings or coatings, or naturally reflective metal may be used in the construction.

In use the translucent portion 56 shields the bulb 28 and prevents distracting reflections from the surface 62 within the normal field of view. But the translucent portion admits diffused light into barrel 32 above the specimen and subdues shadows which might occur in certain specimens.

Many different types of specimens can be used, such as insects, mineral samples, gems, seeds, plants and other items. With the multiple specimen units in a single viewer, specimens can be arranged in a specific order, such as a life form at different stages of growth to be viewed in succession.

At any time individual units can be removed and replaced or re-arranged. Each individual unit can be used in daylight or with any light source, to view the specimen through the eyepiece or through the transparent zone of the barrel. In addition to controlling the light distribution, the particular zoned design of the barrel with the fully transparent portion permits direct viewing of the specimen in its natural size, which can be a great advantage. In contrast to conventional magnifying viewers of the low power microscope type, which are usually back lighted, the present viewer provides for detailed study of solid specimens of substantial size, the specimens being completely protected in the sealed units.

It is understood that minor variation from the form of the invention disclosed herein may be made without departure from the spirit and scope of the invention, and that the specification and drawings are to be considered as merely illustrative rather than limiting.

I claim:
1. In combination:
    a viewer comprising a casing having a top and a light source operatively mounted within the casing;
    and at least one specimen unit comprising a barrel effectively extending through said top, a portion of the barrel within the casing being transparent;
    an eyepiece secured in the upper end of said barrel;
    a specimen holder mounted in said barrel substantially at the focus of said eyepiece;
    said casing having means for supporting at least one said specimen unit therein with said light source disposed at the side of said specimen unit so that light from said source passes through said transparent portion to illuminate a specimen on said specimen holder.
2. The combination of claim 1, wherein said barrel has an opaque portion at the end thereof remote from said eyepiece, a translucent portion at the end adjacent said eyepiece, and said transparent zone is between said translucent portion and said opaque portion substantially opposite said specimen holder with the barrel, certain portions of the inside surface of said casing being light reflective so that light is reflected laterally toward said specimen holder.
3. The combination of claim 1, wherein said barrel has a closed end remote from said eyepiece, said specimen holder having a stem passing through said closed end, and sealing means in said closed end securing said stem with said specimen holder in focussed position.
4. A specimen unit for use in an illuminated viewer, the unit comprising:
    a barrel having closed end and an eyepiece at the other end;
    a specimen holder in said barrel having a stem terminally fixed in said closed end, and a specimen platform carried by said stem and disposed within said barrel and substantially at the focus of said eyepiece;
    said barrel having a translucent portion adjacent said eyepiece and a transparent portion surrounding said specimen holder on the side of said translucent portion remote from said eyepiece.

References Cited
UNITED STATES PATENTS

| | | | |
|---|---|---|---|
| 56,178 | 7/1866 | Chase | 350—239 |
| 493,529 | 3/1893 | Stauffer | 350—239 |
| 1,267,862 | 5/1918 | Haefliger | 350—84 |
| 1,873,149 | 8/1932 | Perez | 350—91 |

DAVID SCHONBERG, *Primary Examiner.*

M. J. TOKAR, *Assistant Examiner.*